United States Patent
Akedo et al.

[11] Patent Number: 6,076,561
[45] Date of Patent: Jun. 20, 2000

[54] HEAT INSULATED HOSE

[75] Inventors: Youichi Akedo; Seiji Shiga; Tetsuya Inagake; Hitoya Kodama; Shoji Hattori; Yoshiki Yoshitomi; Masataka Morikawa, all of Kakegawa, Japan

[73] Assignee: Tigers Polymer Corporation, Osaka, Japan

[21] Appl. No.: 09/176,034

[22] Filed: Oct. 21, 1998

[30] Foreign Application Priority Data

Oct. 21, 1997 [JP] Japan .................................. 9-306480
Feb. 17, 1998 [JP] Japan ................................ 10-051398
Apr. 2, 1998 [JP] Japan ................................ 10-108620

[51] Int. Cl.⁷ ...................................................... F16L 9/14
[52] U.S. Cl. ........................... 138/149; 138/30; 138/129; 138/153; 138/154
[58] Field of Search ..................... 138/149, 153, 138/154, 146, 129, 141, 144, 28, 30

[56] References Cited

U.S. PATENT DOCUMENTS

| | | | |
|---|---|---|---|
| 3,073,353 | 1/1963 | Rittenhouse | 138/148 |
| 3,112,771 | 12/1963 | Bringolf | 138/122 |
| 3,115,898 | 12/1963 | Rothermel | 138/122 |
| 3,240,234 | 3/1966 | Bond, Jr. et al. | 138/121 |
| 3,554,237 | 1/1971 | Pelley et al. | 138/122 |
| 3,665,967 | 5/1972 | Kachnik | 138/30 |
| 4,239,064 | 12/1980 | Gilman | 138/137 |
| 4,651,781 | 3/1987 | Kandelman | 138/28 |
| 5,503,193 | 4/1996 | Nygaard | 138/110 |
| 5,806,567 | 9/1998 | Fukui et al. | 138/137 |

FOREIGN PATENT DOCUMENTS

| | | |
|---|---|---|
| 50-31198 | of 1975 | Japan . |
| 5-187594 | 7/1993 | Japan . |
| 8-219335 | 8/1996 | Japan . |
| 9-89357 | 4/1997 | Japan . |

*Primary Examiner*—James Hook
*Attorney, Agent, or Firm*—Hoffmann & Baron, LLP

[57] ABSTRACT

A heat insulated hose includes a cylindrical member. This cylindrical member is formed by helically winding a laminated tape having a base layer of a foamed resin, a permeable coat film laminated on an inner surface of the base layer, and an air-tight coat film laminated on an outer surface of the base layer, with adjacent side edges thereof abutted against each other. A resin reinforcing member is helically wound on an outer peripheral surface or inner peripheral surface of the cylindrical member in a manner striding over the adjacent side edges of the laminated tape. The respective side edges of the laminated tape is thermally fused with the resin reinforcing member, thereby integrally joining between the adjacent side edges.

31 Claims, 8 Drawing Sheets

HEAT INSULATED HOSE

BACKGROUND OF THE INVENTION

1. Field of the Invention

This invention relates to heat insulated hoses and, more particularly, to a flexible heat insulated hose suited particularly for heat insulated ducts for transporting air conditioning gases, with which piping can be laid in a freely bendable fashion.

2. Description of the Prior Art

Figure 13:
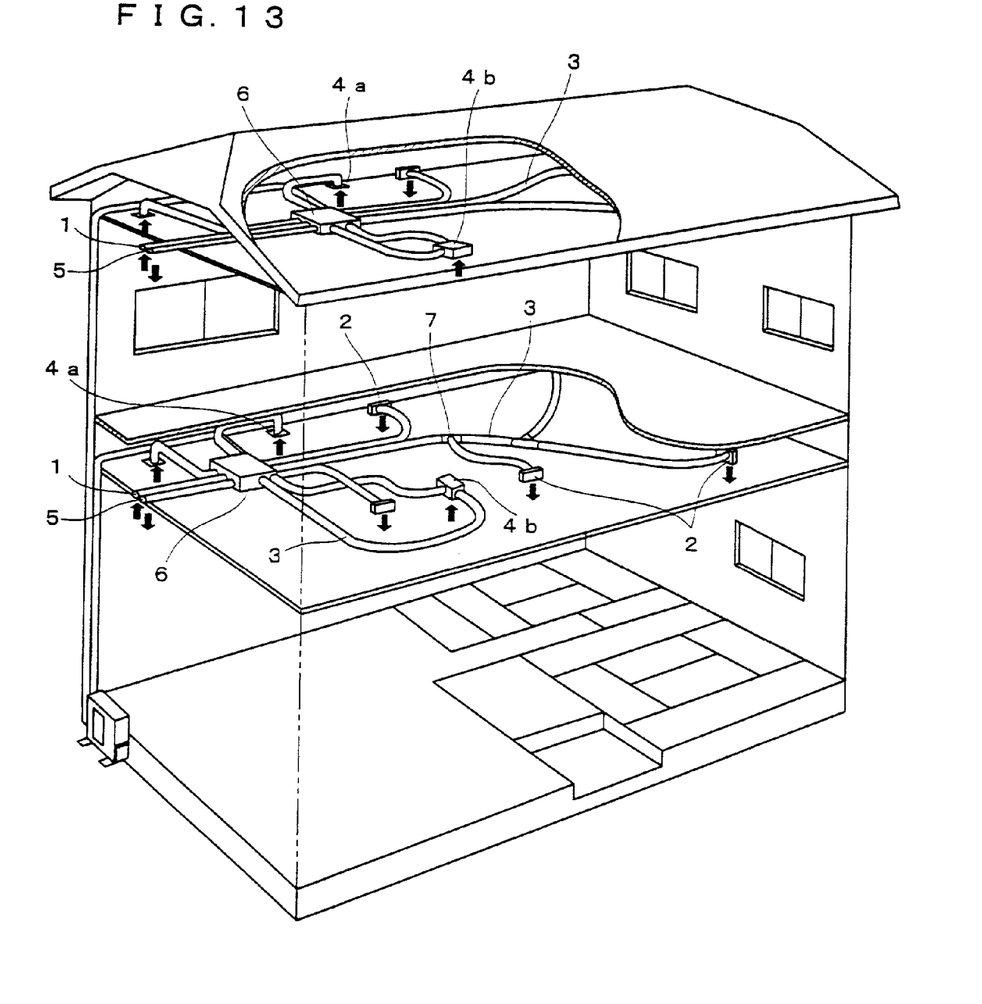
FIG. 13 is an illustrative view showing arrangement of duct hoses within a high density heat insulated house as a background of the present invention.

The heat insulated hoses of this kind are typically applied for air-conditioning duct hoses, as used in a high density heat insulated house shown in FIG. 13. The high density heat insulated house refers to a house in which heat loss occurring through the wall, ceiling, floor, etc. is decreased in order to save the energy required for air conditioning with the in-door temperature and humidity kept stable, providing for comfortable residence environment. In such a house, however, natural ventilation is difficult to implement leading to problems involving air contamination, dew condensation, gathering mold, etc.

To avoid the problems, in this type of a house is adopted an air ventilating or conditioning system which includes local ventilation in kitchen, bath room, etc. to implement air intake and discharge. With such a system, flexible ducts are laid through narrow spaces, such as in-ceiling space and first-to-second floor space, connecting between air blowers, fans, inlet/exit ports of air intake/discharge devices such as air-conditioners, air discharge/suction ports leading to rooms, in order to introduce outdoor air into the room interior through the duct and expel in-room air to the outside through the duct.

The duct used in such an application requires a flexible, elongate hose to facilitate piping work. The hose must be light in weight, easy to handle and low in fluid pressure loss with smoothened inner surface.

Further, the duct experiences significant temperature difference between the inside and outside thereof. Measures have to be taken to prevent dew from condensing on the outer surface of the duct. In this respect, heat insulatability is at least required for the duct. Moreover, there is a fear that noise due to the air intake/discharge device propagate into the room via the duct acting as a sound passage. Due to this, sound absorbability has to be given to the duct. That is, the heat insulated hose to which the invention is directed preferably has both heat insulatability and sound absorbability.

In FIG. 13, an elongate flexible duct hose 3 is used to connect between an intake port 1 leading to an air conditioner or the like and an exit port 2 leading to a room interior. Also connection is made by an elongate flexible duct between a suction port 4a and suction box 4b leading to the room requiring air ventilation and discharge port 5 leading to the outside of the room. Incidentally, the duct hose 3 is laid through a heat-pump type heat-exchanging air conditioning in-door unit 6 and a branch pipe 7. In a house as in FIG. 13, the room temperature and humidity are controlled by introducing cool or warm air through the exit port 2 into the room interior. At the same time, contaminated air is sucked through the suction port 4a or suction box 4b and discharged through the discharge port 5.

A first prior art of a heat insulated hose suitably applicable for the above type of the flexible duct hose is disclosed, for example, in Japanese Laying-Open No. H5-187594 [F16L 59/153, 11/10] laid open to public on Jul. 27, 1993. The heat insulated hose in the first prior art is structured by an inner layer formed by helically wining a non-rigid synthetic tape, and an outer layer formed thereon by helically winding a rigid resin rigid synthetic tape over an outer periphery of the foamed resin tape.

In this prior art heat insulated hose, the non-rigid resin tapes of the inner and outer layers are required as materials for the hose, separately from the foamed resin tape for the insulation layer. There is a difficulty in reducing the wall thickness of these non-rigid resin tapes to an extreme extent, thus imposing limitation to the light-weightening as desired in handling the hose.

Further, a plurality of tapes, including an inner-layer non-rigid resin tape, insulation-layer foamed resin tape and outer-layer non-rigid resin tape, have to be helically wound by laminating over one another at a same pitch to form a hose. Accordingly, there requires an equipment to induce the respective tapes onto an axis of hose forming. This, however, requires complicated pitch-adjusting operations as well as troublesome management on inventories of the various tapes.

Also, a second prior art is disclosed, for example, in Japanese Patent Laying-Open No. H9-89357 [F24F 13/02 F16L 55/02] laid open to public on Apr. 4, 1997. The heat-insulated sound-absorbing duct in this second prior art has an inner layer, an open-cell foamed resin layer, an intermediate sheet layer, a closed-cell foamed resin layer and an outermost layer, which are separately layered in order from the inner side.

In this second prior art heat-insulated sound-absorbing duct, a multiplicity of layer-foaming strips have to be helically wound by laminating in order at a same pitch, in addition to the fibrous and resin-reinforcing strips as inner-layer forming materials. This therefore requires an equipment to induce the various strips onto a hose forming axis. Further, there encounters troublesomeness in pitch adjusting operations and management on inventories for the various strip materials. In addition, there is a limitation against the realization of duct weigh reduction.

SUMMARY OF THE INVENTION

Therefore, it is a primary object of the present invention to provide a novel heat insulated hose.

It is another object of the present invention to provide a heat insulated hose which can be made with further reduced in weight.

It is another object of the present invention to provide a heat insulated hose which is easy to manufacture.

A heat insulated hose according to the present invention, comprises: a cylindrical member formed by a base layer of a foamed resin, a permeable coat film laminated on an inner surface of the base layer, and an air-tight coat film laminated on an outer surface of the base layer; and a resin reinforcing member wound on at least one of an outer peripheral surface and an inner peripheral surface of the cylindrical member.

Preferably, the cylindrical member is formed by helically winding a foamed resin tape.

In one embodiment the base layer includes an open-cell foamed resin layer or a closed-cell foamed resin layer. In another embodiment the base layer includes an open-cell foamed resin layer and a closed-cell foamed resin layer laminated on the open-cell foamed resin layer.

The permeable coat film serves to protect the foamed resin constituting the base layer, and reduces the resistance for a fluid flowing the heat insulated hose. Also the base layer, if including an open-cell foamed resin layer, exhibits as a sound absorbing layer by allowing a fluid to contact with the foamed resin as the base layer through the permeable coat film. The air-tight coat film serves to prevent a gas (particularly, for air conditioning) flowing through the hose interior from leaking to the outside of the hose through the permeable coat film and the base film, thus providing air-tightness to the heat insulated hose.

In one aspect of the present invention, a heat insulated hose, comprises: a cylindrical member, the cylindrical member being formed by helically winding, with adjacent side edges thereof abutted against each other, a laminated tape having a base layer of a foamed resin, a permeable coat film laminated on an inner surface of the base layer, an air-tight coat film laminated on an outer surface of the base layer; and a resin reinforcing member helically wound on at least one of an outer peripheral surface and an inner peripheral surface of the cylindrical member, the resin reinforcing member being integrally joined between adjacent side edges of the laminated tape.

In this aspect, the main body (cylindrical member) of the heat insulated hose can be formed only by helically winding the laminated tape having, as a single member, the foamed resin base layer laminated with the permeable coat film and the air-tight coat film at respective inner and outer surfaces. Accordingly, there are no necessity of using such members as a synthetic resin tape or tube to form an inner and outer layers, separately from this laminated tape. Also the coat film laminated on the base layer can be significantly reduced in its thickness.

Further, the laminated tape at its side edges is thermally fused with the resin reinforcing member helically wound simultaneous with the laminated tape so that adjacent side edges of the laminated tape are joined through the resin reinforcing member. Thus the laminated tape is very easy to be helically wound over.

Also, because the resin reinforcing member is fixed striding over adjacent side edges of the laminated tape, no gap occurs between adjacent ones of the laminated tape at the bent portion when the heat insulated hose is bent. Therefore, there is no possibility that heat insulatability deteriorates at the bent portion resulting in dew condensation. The heat insulation is satisfactorily secured even if the base layer or foamed resin layer of the laminated tape, i.e. heat insulated hose, is of a single layer.

The present invention provides a heat insulated hose which is extremely light-weighted, easy to handle during transportation and laying work, and ready to form wherein the number of constituent parts are reduced to a minimum. Further, the heat insulated hose of the invention can posses both good heat insulation and sound absorption with reduced fluid resistance, thus being suited for applications of house ventilation or air conditioning.

Incidentally, when the reinforcing member is provided on the outer peripheral surface side, the reinforcing member is thermally fused with adjacent side edges of the air-tight coat film of the laminated tape thereby integrally joining between the side edges. When the reinforcing member is provided on the inner peripheral surface side, the reinforcing member is thermally fused with adjacent side edges of the permeable coat film of the laminated tape thereby integrally joining between the side edges.

Also, the base layer of the laminated tape may include an open-cell foamed resin layer and a closed-cell foamed resin layer, or otherwise a composite foamed resin layer mixed with an open-cell foamed resin and a closed-cell foamed resin.

The laminated tape may have dew preventive coat film laminated at an outer surface with. In such a case, if the reinforcing member is provided on the outer peripheral surface of the cylindrical member, the reinforcing member integrally joins side edges of the dew preventive coat film by thermal fusion. Also, when an auxiliary reinforcing member is provided in a pitch of an outer surface reinforcing member, the auxiliary reinforcing member also thermally fused with the dew preventive coat film.

Further, an auxiliary reinforcing member may be provided which is helically wound within a pitch of the reinforcing member and fixed onto at least one of the permeable coat film and the air-tight coat film on at least one of the inner peripheral surface and the outer peripheral surface of the cylindrical member.

In one embodiment the reinforcing member may include a first reinforcing member provided on the outer peripheral surface of the cylindrical member and a second reinforcing member provided on the inner peripheral surface of the cylindrical member. In such a case, the first reinforcing member is thermally fused with adjacent side edges of the permeable coat film of the laminated tape thereby integrally joining between side edges, while the second reinforcing is thermally fused with adjacent side edges of the air-tight coat film of the laminated tape thereby integrally joining between the side edges.

The auxiliary reinforcing member may include a first auxiliary reinforcing member placed between adjacent ones of the first reinforcing member and/or a second auxiliary reinforcing placed between adjacent ones of the second reinforcing member.

In another aspect of the present invention, a heat insulated hose comprises a sound-absorbing heat-insulating layer including a non-rigid first foamed resin layer and a rigid second foamed resin layer laminated on an outer side thereof, wherein the fist foamed resin layer is formed by helically winding a first foamed resin tape laminated at an inner surface with a permeable coat film with adjacent side edges thereof abutted against each other, and further the adjacent side edges of the first foamed resin tape being integrally joined through an inner-surface reinforcing member thermally fused with side edges of the permeable coat film, the second foamed resin layer being formed by helically winding a second foamed resin tape having an air-tight coat film laminated at an outer surface with adjacent side edges thereof abutted against each other, and further adjacent side edges of the second foamed resin tape being integrally joined through an outer surface reinforcing member thermally fused with the side edges of the air-tight coat film.

In this aspect, preferably, the first foamed resin tape may include an open-cell foamed resin while the second foamed resin tape include a closed-cell foamed resin.

In this aspect, a sound-absorbing heat-insulated layer for the hose can be formed only by separately winding helically the first foamed resin tape having an open-cell foamed resin layer laminated at an inner surface with the permeable coat film and the second foamed resin tape having a closed-cell foamed resin layer laminated at an outer surface with the air-tight coat film, and then integrally joining the respective side edges of the tapes by the reinforcing member. Besides these, there is no necessity of using such a member as a fibrous strip or synthetic resin tape to form an inner layer or outer layer. The coat film laminated on a foamed resin layer can be significantly reduced in its thickness.

The first foamed resin tape constituted by the open-cell foamed resin layer and the permeable thin film is joined at its adjacent side edges through a resin inner-surface reinforcing member that is simultaneously helically wound on the inner peripheral surface in a manner striding over the side edges by thermal fusion. It is therefore possible to easily join between adjacent ones of the first foamed resin tape helically wound, without spending time or labor.

Similarly, the second foamed resin tape constituted by the closed-cell foamed resin layer and the air-tight coat film is joined at adjacent side edges through the outer reinforcing member by simultaneously helically winding on the outer peripheral surface in a manner striding over the side edges by thermal fusing. It is possible to easily joining between adjacent ones of the second foamed resin tape helically wound, without spending time and labor.

Incidentally, in the embodiment the first foamed resin tape may further include a resin film laminated at an outer surface thereof. The heat insulated hose further provided with an intermediate reinforcing member thermally fused with the respective side edges of the resin film and integrally joining between the adjacent side edges of the first foamed resin tape. By joining the intermediate reinforcing member with the resin film, the first foamed resin tape can be reinforced with higher rigidity.

An auxiliary reinforcing member may be provided which is helically wound within a pitch of the inner-surface reinforcing member fixed on the inner peripheral surface of the first foamed resin layer.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
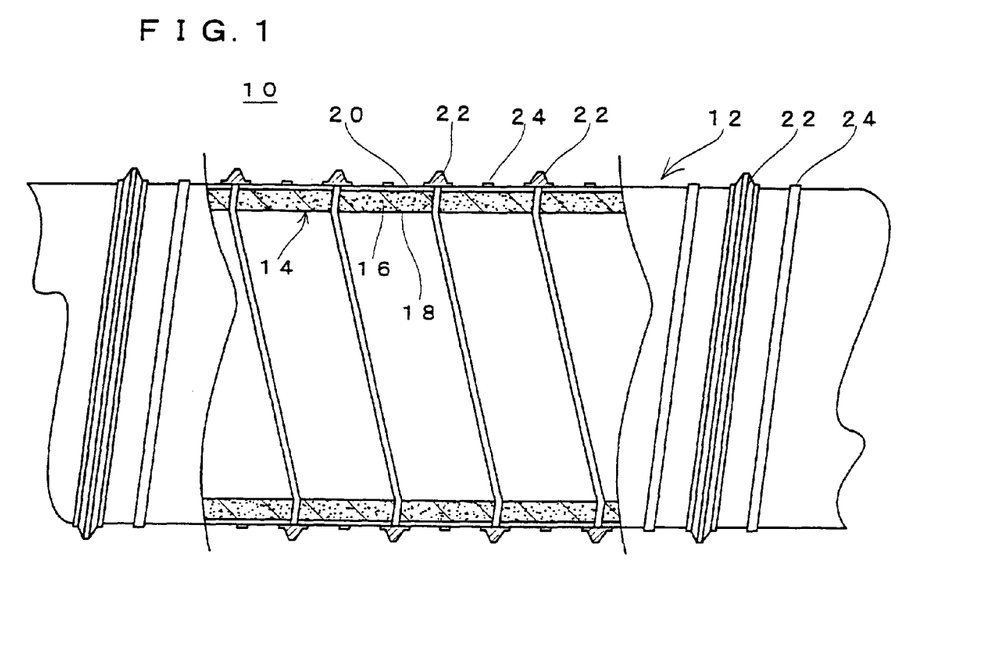
FIG. 1 is a fragmentary sectional front view showing one embodiment of the present invention.
Figure 2:
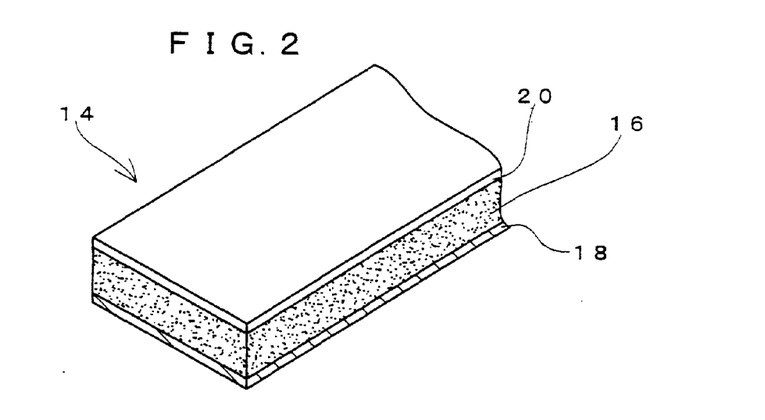
FIG. 2 is a perspective view showing laminated tape employed in the FIG. 1 embodiment.

Referring to FIG. 1, a heat insulated hose 10 in this embodiment includes a cylindrical member 12. This cylindrical member 12 is formed by helically winding a laminated tape 14. The laminated tape 14 is formed, as shown in FIG. 2, by a base layer 16 of a non-rigid polyurethane foamed material, a permeable coat film 18 of a polypropylene (PP) fibrous non-woven fabric laminated on an inner surface of the base layer 16, and an air-tight coat film 20 of a polypropylene resin film laminated on an outer surface of the base layer 16.

The foamed resin, constituting the base layer 16 for the laminated tape 14, serves mainly to give heat insulation, which may be either an open-cell foamed resin or a closed-cell foamed resin, or otherwise, a composite foamed resin mixed with both open cells and closed cells.

The open-cell foamed resins include foamed materials, such as polyurethane, polyethylene, ethylene vinylacetate (EVA). The closed-cell foamed resins involve foamed materials, such as polyethylene and ethylene vinylacetate, wherein a non-rigid polyurethane foamed material is particularly preferred due to its excellent heat insulatability and noise absorbability as well.

The permeable coat film 18, to be laminated on the inner surface of the base layer 16, allows a fluid to pass to the base layer to offer for thermal insulation and sound absorption, and also serves as a protection layer to prevent the foamed resin layer 16 from being damaged or deteriorated. The permeable coat film 18 is made extremely thin and light-weighted in order to give smoothness to the inner surface of the insulated hose 10, reducing fluid resistance (pressure loss). This permeable coat film 18 may use a fibrous material, such as a woven fabric or non-woven fabric, wherein a non-woven fabric such as of polyester, nylon or polypropylene, is preferred. This permeable coat film and the open-cell foamed resin base layer cooperate to exhibit excellent sound absorbability.

On the other hand, the air-tight coat film 20, to be laminated on the outer surface of the base layer 16, provides the heat insulated hose 10 with air tightness, positively preventing against fluid leaking. Incidentally, where a resin reinforcing member 22 (FIG. 1) is wound over the outer surface of the heat insulated hose 10, the air-tight coat film 20 is thermally fused with the resin reinforcing member 22. The air-tight coat film 20 has an extremely reduced thickness, similarly to the permeable coat film 18. Accordingly, the air-tight coat film 20 is very light-weighted. This air-tight coat film 20 may use a resin film, such as of polyethylene, ethylene vinylacetate, and polypropylene.

The laminated tape 14 (see FIG. 2) thus structured is helically wound with adjacent side edges abutted against each other, thereby foaming a hose wall or cylindrical member 12. The resin reinforcing member 22, for example, of rigid polypropylene is helically wound over an outer periphery of the air-tight coat film 20 forming an outer surface of the hose wall or cylindrical member 12. By thermally fusing the respective side edges of the air-tight coat film 20 with the resin reinforcing member 22, the resin reinforcing member 22 and the hose wall or cylindrical member 12 are formed into one body. In this embodiment, the resin reinforcing member 22 has predetermined height with a bottom surface formed wider than the top. The broadened bottom serves to positively connect adjacent side edges of the laminated tape 14, while the narrowed top functions to decrease frictional resistance in transporting the insulated hose 10 along its axial direction.

Further, between adjacent ones of the resin reinforcing member 22 is helically wound an auxiliary reinforcing member 24 formed, for example, of polypropylene with a sectional area smaller than the member 22. This auxiliary reinforcing member 24 is integrated with the air-tight coat film 4 by thermal fusion.

Figure 8:
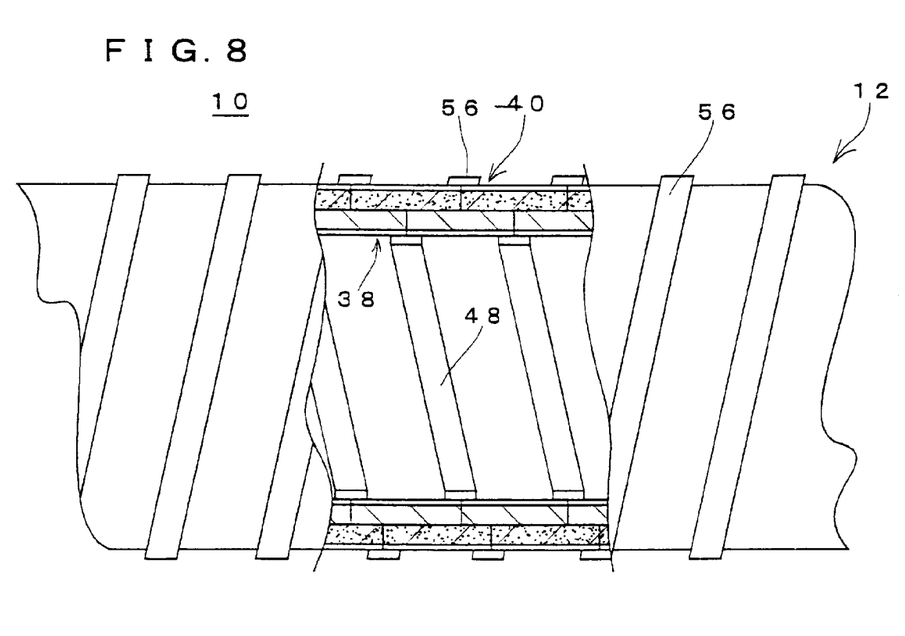
FIG. 8 is a fragmentary sectional front view showing still another embodiment of the present invention.

The heat insulated hose 10 is manufactured as shown in FIG. 8, by helically winding at the same time a previously prepared laminated tape 14, a resin reinforcing member 22 and auxiliary reinforcing member 24 immediately after extruded, over a canti-lever hose forming axis 26.

In this manner, the heat insulated hose 10 manufactured by helically winding the laminated tape 14 provides an elongate hose in which the base layer continues over an infinite length in its axial direction. This makes the elongate duct hose (e.g. 10 m–30 m) as explained before to be laid with easiness. Also, because the laminated tape 14 has only the permeable coat film 18 and air-tight coat film 20 laminated thereon, the heat insulated hose 10 as a whole is reduced in weight. Further, since the base layer 16 of the laminated tape 14 is formed of a flexible material such as a foamed resin, the heat insulated hose 10 is also given flexibility.

Figure 7:
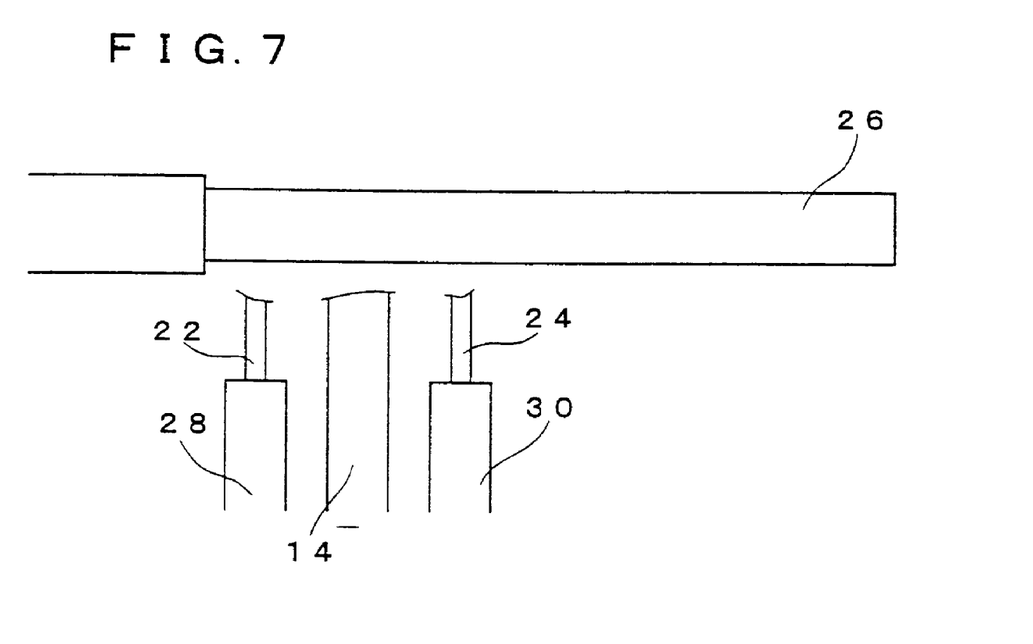
FIG. 7 is an illustrative view showing a method to manufacture a heat insulated hose of the FIG. 1 embodiment.

More specifically, the laminated tape 14 is withdrawn out of a reel (not shown) in a wound form. The laminated tape 14 withdrawn is helically wound over the hose forming axis 26 such that its adjacent side edges are abutted against each other. A resin reinforcing member 22 is extruded from an extruder 28. The resin reinforcing member 22 in a molten state is wound over the surface of the air-tight coat film 20 in a manner striding over the adjacent side edges of the laminated tape 14. Accordingly, the resin reinforcing member 22 is thermally fused with the adjacent side edges of the air-tight coat film 20. That is, the laminated tape 14 is not directly joined at its adjacent side edges but the respective side edges are thermally fused with the resin reinforcing member 22, thereby achieving integral joining. Also, the auxiliary reinforcing member 24 in a molten state extruded from an extruder 30 is thermally fused with the air-tight coat film 20 at almost a center in width direction of the laminated tape 14.

Incidentally, although not shown, the hose forming axis 26 is provided with a well-known mechanism as, for example, in Japanese Patent Publication No. S50-31198, by which mechanism the laminated tape 14 and the reinforcing members 22, 24 wound around the axis 26 can be helically advanced.

In the above preferred example of the embodiment, the non-rigid polyurethane foamed material constituting the base layer 16 for the laminated tape 14 has a density of 20 Kg/m$^3$, a width of 30 mm and a thickness of 8 mm, and laminated with a non-woven fabric as permeable coat film 18 having a mass per unit area of 50 g/m$^2$ and with a resin film as a layer-tight coat film 20 having a thickness of 0.02 mm.

Figure 3:
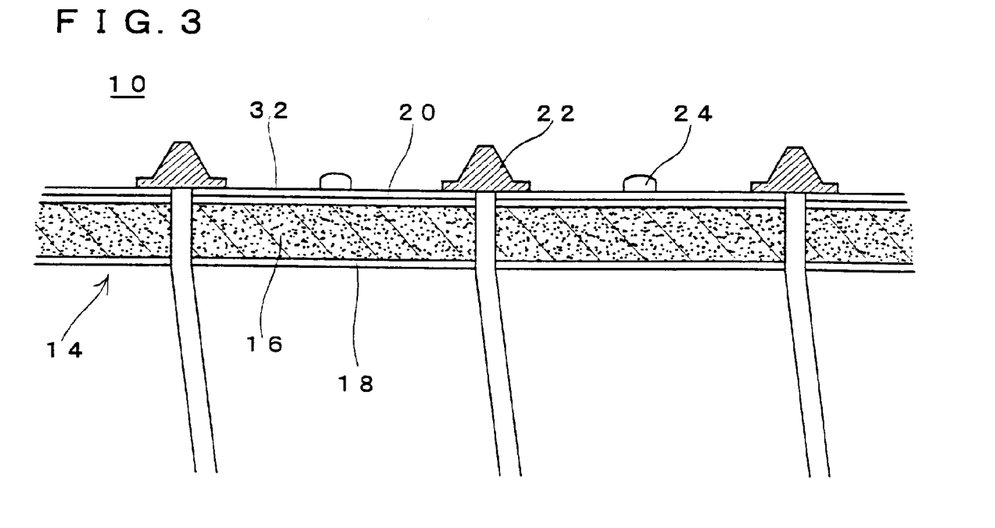
FIG. 3 is a partly magnified sectional view showing another embodiment of the present invention.

In another embodiment shown in FIG. 3, a dew preventive coat film 32 of a polypropylene fibrous non-woven fabric having, for example, a mass per unit area of 50 g/m$^2$ is laminated on the outer surface of the air-tight coat film 20 of the laminated tape 14 used for the heat insulated hose 10. The resin reinforcing member 22 and the auxiliary reinforcing member 24 are thermally fused with this non-woven fabric layer 32 constituting an outer surface of the heat insulated hose 10.

Figure 4:
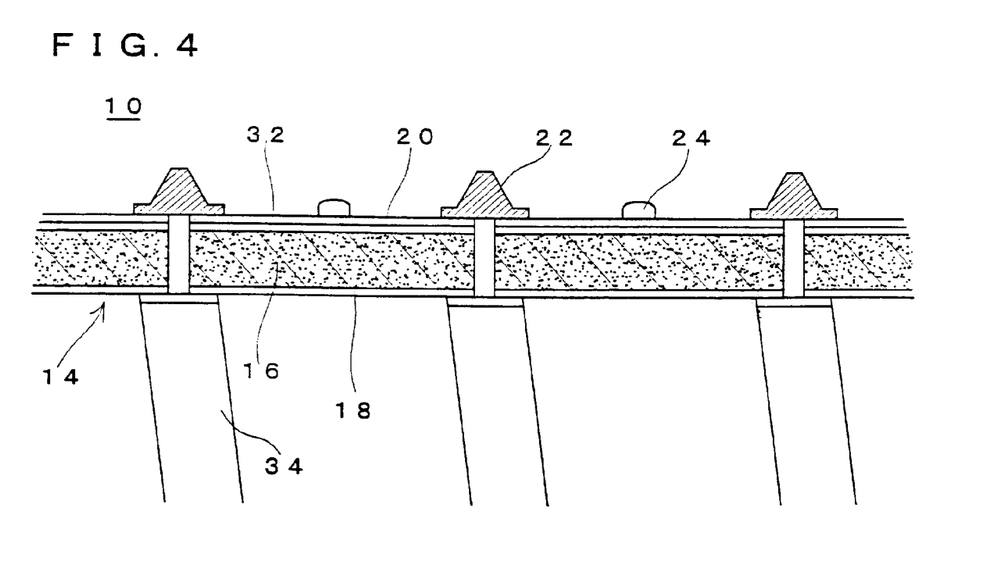
FIG. 4 is a partly magnified sectional view showing another embodiment of the present invention.

In an embodiment shown in FIG. 4, an inner-surface reinforcing strip 34 of a rigid polypropylene having a thickness, for example, of 0.2 mm is used. That is, an inner-surface reinforcing strip 34 is helically wound striding over the adjacent side edges of the laminated tape 14 on the inner peripheral surface of the heat insulated hose 10. This inner-surface reinforcing strip 34 is thermally fused with the side edges of the permeable coat film 18 of the laminated tape 14, thereby integrally joining between the side edges of laminated tape 14 on the inner surface of the heat insulated hose 10.

Figure 5:
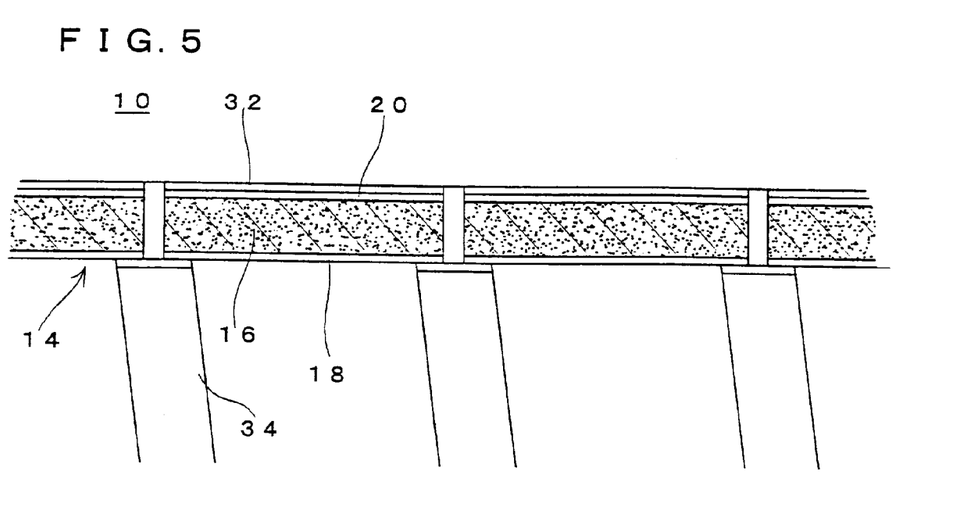
FIG. 5 is a partly magnified sectional view showing another embodiment of the present invention.

In a still another embodiment shown in FIG. 5, the resin reinforcing member 22 and the auxiliary reinforcing member 24 are omitted from the heat insulated hose 10 of the FIG. 4 embodiment, to thereby utilize the inner-surface reinforcing strip 34 only. That is, in this embodiment the inner-surface reinforcing strip 34 is thermally fused with the permeable coat film 18 of the laminated tape 14 thereby integrally connecting between adjacent side edges of the laminated tape 14.

Figure 6:
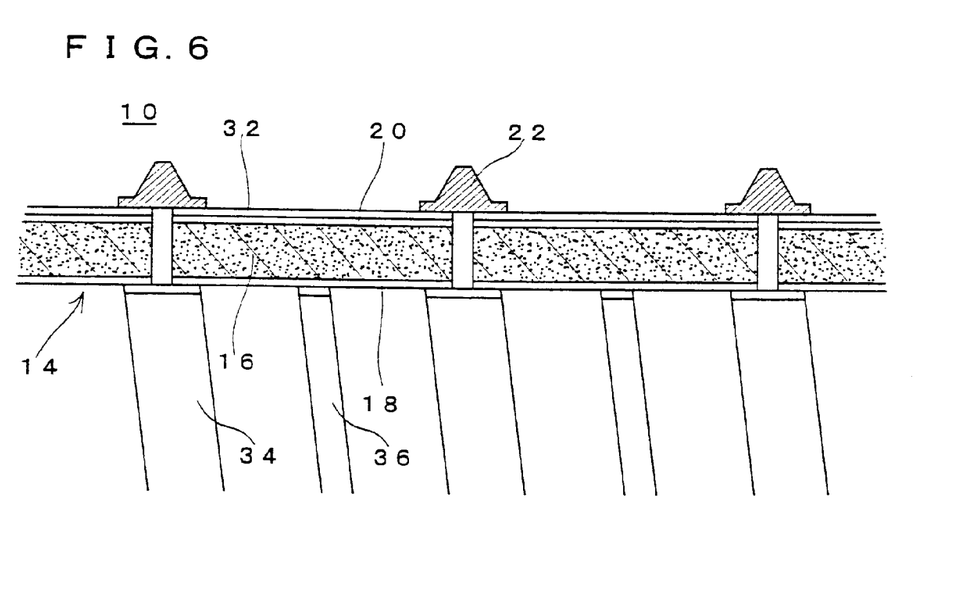
FIG. 6 is a partly magnified sectional view showing another embodiment of the present invention.

In further embodiment shown in FIG. 6, the auxiliary reinforcing member 24 is omitted from the heat insulated hose 10 of the FIG. 4 embodiment, and a auxiliary reinforcing strip 36, for example, of polypropylene having a sectional area smaller than that of the inner-surface reinforcing strip 34 is helically wound between adjacent ones of the inner-surface reinforcing strips 34. The auxiliary reinforcing strip 32 is thermally fused with the permeable coat film 18.

Incidentally, it is desired that the inner-surface reinforcing strip 34 and the auxiliary reinforcing strip 36 are made as thin as possible provided that they can effect reinforcing functions. This is because, if these reinforcing strips 34 and/or 36 are excessively thick, the heat insulated hose 10 has increased fluid resistance at its inner surface. That is, the inner-surface reinforcing strip 34 and the auxiliary reinforcing strip 36 are formed thin so as not to impair the smoothness at the inner surface of the heat insulated hose 10.

Besides the above embodiments, the present invention covers the following modifications. That is, a heat insulated hose omitted of the auxiliary reinforcing member 24 from the FIG. 1 embodiment or FIG. 4 embodiment. A heat insulated hose omitted of the dew preventive coat film 30 from any of the FIG. 3 to FIG. 6 embodiments. A heat insulated hose fitted with an auxiliary reinforcing strip 36 in the FIG. 5 embodiment. A heat insulated hose fitted with an auxiliary reinforcing member 24 in the FIG. 6 embodiment. Accordingly, it is possible to constitute a suitable heat insulated hose through appropriately combining constituent elements.

Incidentally, although in the above embodiment the base layer 16 of the laminated tape 14 was formed by a single foamed resin layer, this base layer 16 may be formed by a foamed resin layer including two sub-layers.

FIG. 8 is an illustrative view showing still another embodiment of the present invention, wherein the heat insulated hose 10 is formed by laminating with a first foamed resin layer 38 and a second foamed resin layer 40.

Figure 9:
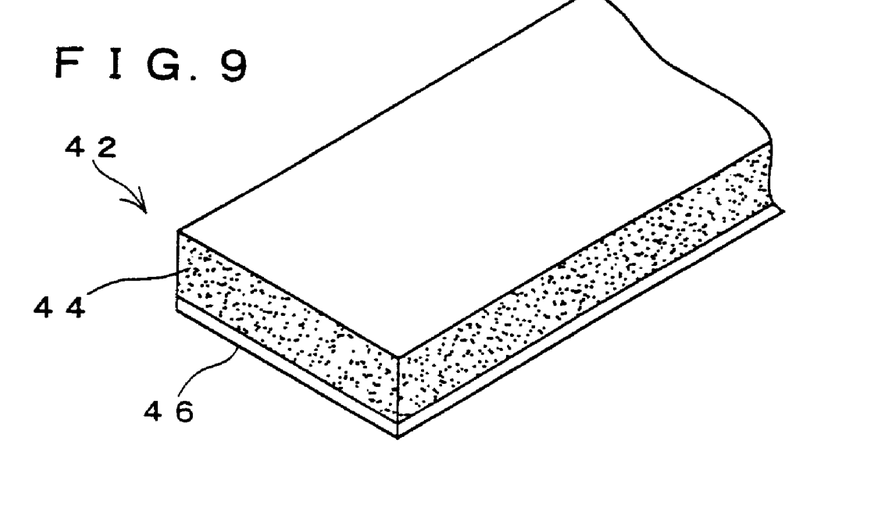
FIG. 9 is a perspective view showing an open-cell foamed resin tape employed in the FIG. 8 embodiment.

The first foamed resin layer 38 is formed by using a first foamed resin tape 42. This first foamed resin tape 42 is formed, as shown in FIG. 9, by an open-cell foamed resin layer 44, for example, of a non-rigid polyurethane foam material and a permeable coat film 46, for example, of a polypropylene fibrous non-woven fabric laminated on an inner surface of the layer 44. The first foamed resin tape 42 is helically wound with adjacent side edges abutted against each other, and an inner reinforcing strip 48, for example, of rigid polypropylene is helically wound on an inner surface of the permeable coat film 46 constituting an inner peripheral surface of the heat insulated hose 10. The reinforcing strip 48 is thermally fused with adjacent side edges of the permeable coat film 46.

This first foamed resin layer 38 is formed by simultaneously helically winding on a hose forming axis as shown in FIG. 7, a previously-formed first foamed resin tape 42 and an inner-surface reinforcing strip 48 immediately after being extruded. That is, the first foamed resin tape 42 is wound such that its adjacent side edges are almost abutted against each other, and an inner reinforcing strip 48 in fused state is laid on an inner surface of the permeable coat film 46 in a manner striding over the adjacent edges of the inner-surface reinforcing strip 48. That is, the reinforcing strip 48 is thermally fused with the side edges of the permeable coat film 46. Due to this, the first foamed resin tape 42 at adjacent side edges is integrally joined through the inner-surface reinforcing strip 48 without direct joining between these edges.

Figure 10:
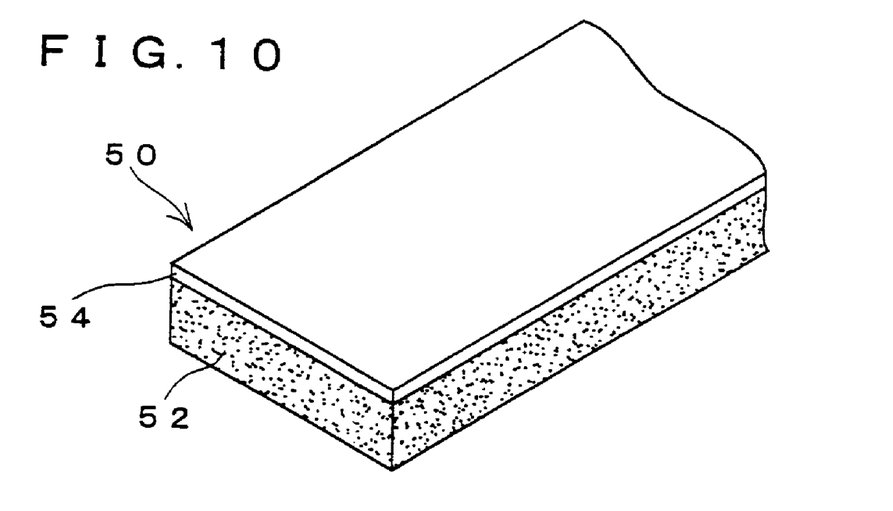
FIG. 10 is a perspective view showing a closed-cell foamed resin tape employed in the FIG. 8 embodiment.

The second foamed resin layer 40 is formed by a second foamed resin tape 50 helically wound on an outer surface of the first foamed resin layer 38. The second foamed resin tape 50 is formed, as shown in FIG. 10, by a closed-cell foamed resin layer 52, for example, of a non-rigid polyethylene foamed material shown in FIG. 10 and an air-tight coat film 54, for example, of a polypropylene resin film laminated on an outer surface of the layer 52. Then the second foamed resin tape 50 is helically wound with adjacent side edges abutted against each other, and a reinforcing member 56, for example, of a rigid polypropylene resin is helically wound on an outer surface of the air-tight coat film 54 constituting an outer peripheral surface of the heat insulated hose 10. The reinforcing member 56 is thermally fused with the side edges of the air-tight coat film 52.

This second foamed resin layer 40 is formed by simultaneously helically winding, on a hose forming axis as shown in FIG. 7 already formed thereon with the first foamed resin layer 8, a previously-formed second foamed resin tape 50 and a resin reinforcing member 56 immediately after being extruded. That is, the second foamed resin tape 50 is wound with adjacent side edges abutted against each other, and the resin reinforcing member 56 in a fused state is laid on an inner surface of the air-tight coat film 54 in a manner striding over the adjacent side edges of the member 56. Accordingly, the reinforcing member 56 is thermally fused with the side edges of the air-tight coat film 54. Due to this, the second foamed resin tape 50 at adjacent side edges is integrally jointed through the resin reinforcing member 56 without direct joining therebetween.

The open-cell foamed resins for forming the first foamed resin tape 42 include, principally, materials excellent in sound absorption, such as foamed resins, including polyurethane, polyethylene (PE) and ethylene vinylacetate, preferably a non-rigid polyurethane foamed material. The closed-cell foamed resins for forming the second foamed resin tape include, principally, materials excellent in heat insulation, such as formed resins, including polyethylene, ethylene vinylacetate, preferably a non-rigid polyethylene foamed material.

The permeable coat film 46 to be laminated on an inner surface of the first foamed resin tape 42 may use fibrous materials such as woven fabric and non-woven fabric, similarly to the permeable coat film 18 in the aforesaid embodiments, and preferably a non-woven fabric such as of polyester, nylon and polypropylene. Also, the air-tight coat film 52 to be laminated on an outer surface of the second foamed resin tape 50 is preferably of a resin film such as of polyethylene, ethylene vinylacetate and polypropylene, similarly to the air-tight coat film in the aforesaid embodiments.

Incidentally, the non-woven fabric to be laminated as a permeable coat film 46 has a mass unit area of 50 g/m², while the resin film to be laminated as an air-tight coat film 54 has a wall thickness of approximately 0.02 mm.

Figure 11:
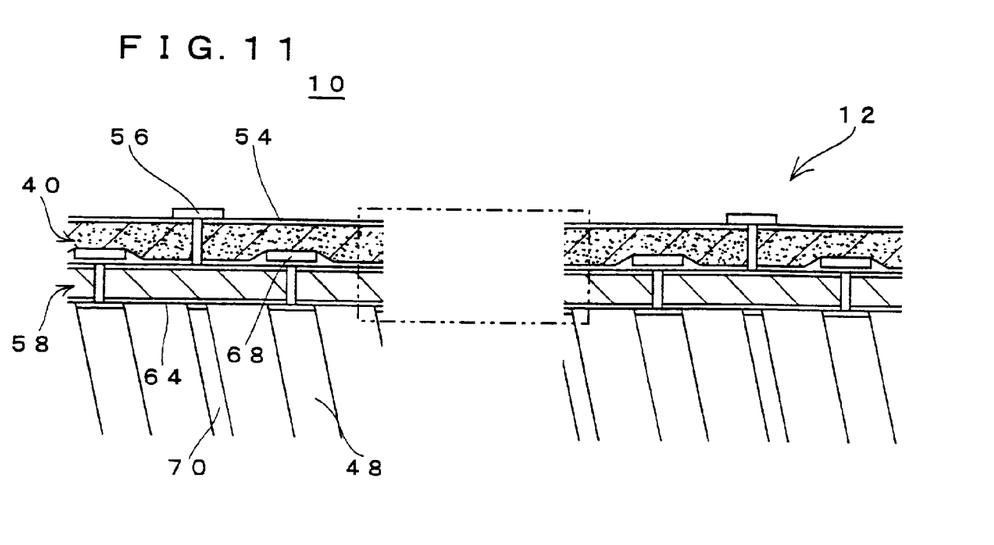
FIG. 11 is a partly magnified sectional view showing another embodiment of the present invention.
Figure 12:
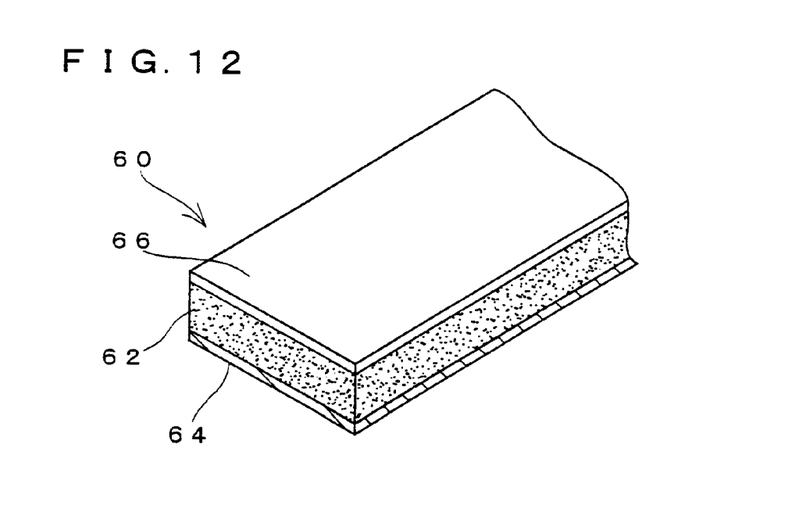
FIG. 12 is a perspective view showing another example of the open-cell foamed resin tape employed in the FIG. 11 embodiment.

FIG. 11 shows a modification to the FIG. 8 embodiment. In this FIG. 11 embodiment a first foamed resin layer 58, in place of the first foamed resin layer 38 of FIG. 8, is formed using the first foamed resin tape 60 shown in FIG. 12. The foamed resin tape 60 shown in FIG. 12 is formed by an open-cell foamed resin layer 62, for example, of a non-rigid polyurethane formed material, a permeable coat film 64, for example, of a polypropylene fibrous non-woven fabric laminated on an inner surface of the layer 62, and a resin film 66, for example, of polypropylene laminated over an outer surface of the film 64.

In the FIG. 11 embodiment, the first foamed resin tape 60 is helically wound with adjacent side edges abutted against each other. The inner-surface reinforcing strip 48, for example, of rigid polypropylene is thermally fused with an inner surface of the permeable coat film 64 (FIG. 12) in a manner striding over the adjacent side edges. Further, an intermediate reinforcing strip 68, for example, of rigid polypropylene is helically wound over an outer surface of the resin film 66 (FIG. 12) and fused with the adjacent side edges thereof. The first foamed resin layer 58 is reinforced by the inner-surface reinforcing strip 48 and the intermediate reinforcing strip 68. Further, between adjacent inner-surface reinforcing strips 48 is helically wound an auxiliary reinforcing strip 70, for example, of polypropylene having a sectional area smaller than the strip 48, which is thermally fused with the permeable coat film 64 (FIG. 12).

Incidentally, in the FIG. 11 embodiment, the second foamed resin layer 40 is formed by helically winding the second foamed resin tape 50 (see FIG. 10) on the first foamed resin layer 58, similarly to the FIG. 8 embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A heat insulated hose, comprising:
   a cylindrical member formed by a base layer of a foamed resin, a fluid permeable coat film laminated on an inner surface of said base layer, and an air-tight coat film laminated on an outer surface of said base layer; and
   a resin reinforcing member wound on at least one of an outer peripheral surface and an inner peripheral surface of said cylindrical member.

2. A heat insulated hose according to claim 1, wherein said cylindrical member is formed by helically winding a foamed resin tape.

3. A heat insulated hose according to claim 2, wherein said base layer includes a first foamed resin layer.

4. A heat insulated hose according to claim 3, wherein said first foamed resin layer is an open-cell foamed resin layer.

5. A heat insulated hose according to claim 3, wherein said first foamed resin layer is a closed-cell foamed resin layer.

6. A heat insulated hose according to claim 3, wherein said base layer includes said first foamed resin layer and a second foamed resin layer laminated on said first foamed resin layer.

7. A heat insulated hose according to claim 6, wherein said first foamed resin layer laminated oil an inner surface side of said base layer is an open-cell foamed resin layer, and said second foamed resin layer laminated on an outer surface side of said base layer being a closed-cell foamed resin layer.

8. A heat insulated hose, comprising:
a cylindrical member, said cylindrical member being formed by helically winding, with adjacent side edges thereof abutted against each other, a laminated tape having a base layer of a foamed resin, a fluid permeable coat film laminated on an inner surface of said base layer, an air-tight coat film laminated on an outer surface of said base layer; and
a resin reinforcing member helically wound on at least one of an outer peripheral surface and an inner peripheral surface of said cylindrical member, said resin reinforcing member being integrally joined between adjacent side edges of said laminated tape.

9. A heat insulated hose according to claim 8, wherein said reinforcing member is thermally fused with the adjacent side edges of at least one of said permeable coat film and said air-tight coat film of said laminated tape, thereby integrally joining between the side edges.

10. A heat insulated hose according to claim 8 wherein said base layer includes a foamed resin layer.

11. A heat insulated hose according to claim 10, wherein said foamed resin layer includes an open-cell foamed resin layer.

12. A heat insulated hose according to claim 10, wherein said foamed resin layer includes a closed-cell foamed resin layer.

13. A heat insulated hose according to 10, wherein said foamed resin layer includes a composite resin layer mixed with an open-cell foamed resin and a closed-cell foamed resin.

14. A heat insulated hose according to claim 8, wherein said laminated tape includes a dew preventive coat film laminated on an outer surface of said air-tight coat film.

15. A heat insulated hose according to claim 14, wherein, when said reinforcing member is provided on the outer peripheral surface of said cylindrical member, said reinforcing member integrally joins between side edges of said dew preventive coat film by thermal fusion.

16. A heat insulated hose according to claim 8, further comprising an auxiliary reinforcing member helically wound within a pitch of said reinforcing member on at least one of the inner peripheral surface and the outer peripheral surface of said cylindrical member and fixed to at least one of said permeable coat film and said air-tight coat film.

17. A heat insulated hose according to claim 16, wherein said laminated tape includes a dew preventive coat film laminated on an outer surface of said air-tight coat film.

18. A heat insulated hose according to claim 17, wherein, when said auxiliary reinforcing member is provided on the outer peripheral surface of said cylindrical member, said auxiliary reinforcing member is thermally fused with said dew preventive coat film.

19. A heat insulated hose according to claim 8, wherein said reinforcing member includes a first reinforcing member provided on the outer peripheral surface of said cylindrical member and a second reinforcing member provided on the inner peripheral surface of said cylindrical member.

20. A heat insulated hose according to claim 19, further comprising a second auxiliary reinforcing member placed between adjacent ones of said second reinforcing member.

21. A heat insulated hose according to claim 19, further comprising a first auxiliary reinforcing member placed between adjacent ones of said first reinforcing member.

22. A heat insulated hose according to claim 21, further comprising a second auxiliary reinforcing member placed between adjacent ones of said second reinforcing member.

23. A heat insulated hose according to claim 19, wherein said first reinforcing member is thermally fused with the adjacent side edges of said permeable coat film of said laminated tape to thereby integrally join between the side edges, and said second reinforcing member being thermally fused with the adjacent side edges of said air-tight coat film to thereby integrally join between the side edges.

24. A heat insulated hose according to claim 23, wherein said laminated tape includes a dew preventive coat film laminated on an outer surface of said air-tight coat film, and said first reinforcing member being thermally fused with the adjacent side edges of said dew preventive coat film of said laminated tape to thereby integrally join between the side edges.

25. A heat insulated hose according to claim 8, wherein, when said reinforcing member is provided on the outer peripheral surface of said cylindrical member, said reinforcing member has a predetermined height to have a sectional area decreasing in a height direction.

26. A heat insulated hose according to claim 8, wherein, when said reinforcing member is provided on the inner peripheral surface of said cylindrical member, said reinforcing member is formed in a strip form.

27. A heat insulated hose comprising a sound-absorbing heat-insulating layer including a non-rigid first foamed resin layer and a rigid second foamed resin layer laminated on an outer side thereof, wherein
said first foamed resin layer is formed by helically winding a first foamed resin tape laminated it an inner surface with a fluid permeable coat film with adjacent side edges thereof abutted against each other, and further the adjacent side edges of said first foamed resin tape being integrally joined through an inner-surface reinforcing member thermally fused with side edges of said fluid permeable coat film,
said second foamed resin layer being formed by helically winding a second foamed resin tape having an air-tight coat film laminated at an outer surface with adjacent side edges thereof abutted against each other, and further adjacent side edges of said second foamed resin tape being integrally joined through an outer surface reinforcing member thermally fused with the side edges of said air-tight film.

28. A heat insulated hose according to claim 27, wherein said first foamed resin tape includes an open-cell foamed resin, said second foamed resin tape including a closed-cell foamed resin.

29. A heat insulated hose according to claim 28, further comprising an auxiliary reinforcing member helically wound within a pitch of an inner surface reinforcing member fixed on an inner peripheral surface of said first foamed resin layer.

30. A heat insulated hose according to claim 28, wherein said first foamed resin tape further includes a resin film laminated on an outer surface thereof, said heat insulated hose further comprising an intermediate reinforcing member thermally fused with the side edges of said resin film and integrally joining between the adjacent side edges of said first formed resin tape.

31. A heat insulated hose according to claim 30, further comprising an auxiliary reinforcing member helically wound within a pitch of an inner surface reinforcing member fixed on an inner peripheral surface of said first foamed resin layer.

* * * * *